(12) United States Patent
Pacheco et al.

(10) Patent No.: US 9,652,051 B2
(45) Date of Patent: May 16, 2017

(54) SYSTEM AND METHOD FOR REDIRECTION AND PROCESSING OF AUDIO AND VIDEO DATA BASED ON GESTURE RECOGNITION

(71) Applicant: Dell Products, LP, Round Rock, TX (US)

(72) Inventors: R. Joel Pacheco, Austin, TX (US); Rocco Ancona, Austin, TX (US); Liam B. Quinn, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 350 days.

(21) Appl. No.: 14/268,559

(22) Filed: May 2, 2014

(65) Prior Publication Data

US 2015/0316990 A1 Nov. 5, 2015

(51) Int. Cl.
*G06F 3/01* (2006.01)
*G06F 3/03* (2006.01)
*G06T 7/00* (2017.01)
*G06F 3/06* (2006.01)
*G06F 3/00* (2006.01)
*G06T 7/70* (2017.01)
*G06K 9/00* (2006.01)

(52) U.S. Cl.
CPC ............ *G06F 3/0304* (2013.01); *G06F 3/005* (2013.01); *G06F 3/017* (2013.01); *G06F 3/06* (2013.01); *G06T 7/004* (2013.01); *G06T 7/70* (2017.01); *G06K 9/00389* (2013.01)

(58) Field of Classification Search
CPC .................................. G06F 3/017; G06F 3/01
USPC ......................................................... 715/716
See application file for complete search history.

(56) References Cited

U.S. PATENT DOCUMENTS

| | | |
|---|---|---|
| 2012/0179982 A1 | 7/2012 | Gandhi et al. |
| 2013/0063543 A1 | 3/2013 | Bentley et al. |
| 2014/0067936 A1* | 3/2014 | Seligmann .......... H04L 12/1827 709/204 |
| 2014/0104366 A1 | 4/2014 | Calman et al. |
| 2014/0104369 A1 | 4/2014 | Calman et al. |
| 2014/0168135 A1* | 6/2014 | Saukko ................. G06F 1/1684 345/174 |

* cited by examiner

*Primary Examiner* — Andrea Leggett
(74) *Attorney, Agent, or Firm* — Larson Newman, LLP

(57) ABSTRACT

An information handling system includes a redirection module and an audio/video module. The redirection module receives an audio data frame and an image data frame, analyzes the image data frame for a trigger event. In response the trigger event being detected in the image data frame, the redirection module replaces the audio data frame with a silent audio data frame and provides the silent audio data frame to the audio/video module. Otherwise the redirection module provides the audio data frame to the audio/video module. The audio/video module receives and transmits either the audio data frame or the silent audio data frame.

20 Claims, 5 Drawing Sheets

SYSTEM AND METHOD FOR REDIRECTION AND PROCESSING OF AUDIO AND VIDEO DATA BASED ON GESTURE RECOGNITION

FIELD OF THE DISCLOSURE

The present disclosure generally relates to redirection and processing of audio and video data based on gesture recognition.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

An information handling system can be utilized during a video conference to capture and send audio and video data to other individuals connected to the video conference. The information handling system can process the audio and video data prior to sending the data to other information handling systems connected to the video conference, and can output audio and video received from the other information handling systems.

BRIEF DESCRIPTION OF THE DRAWINGS

It will be appreciated that for simplicity and clarity of illustration, elements illustrated in the Figures are not necessarily drawn to scale. For example, the dimensions of sonic elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
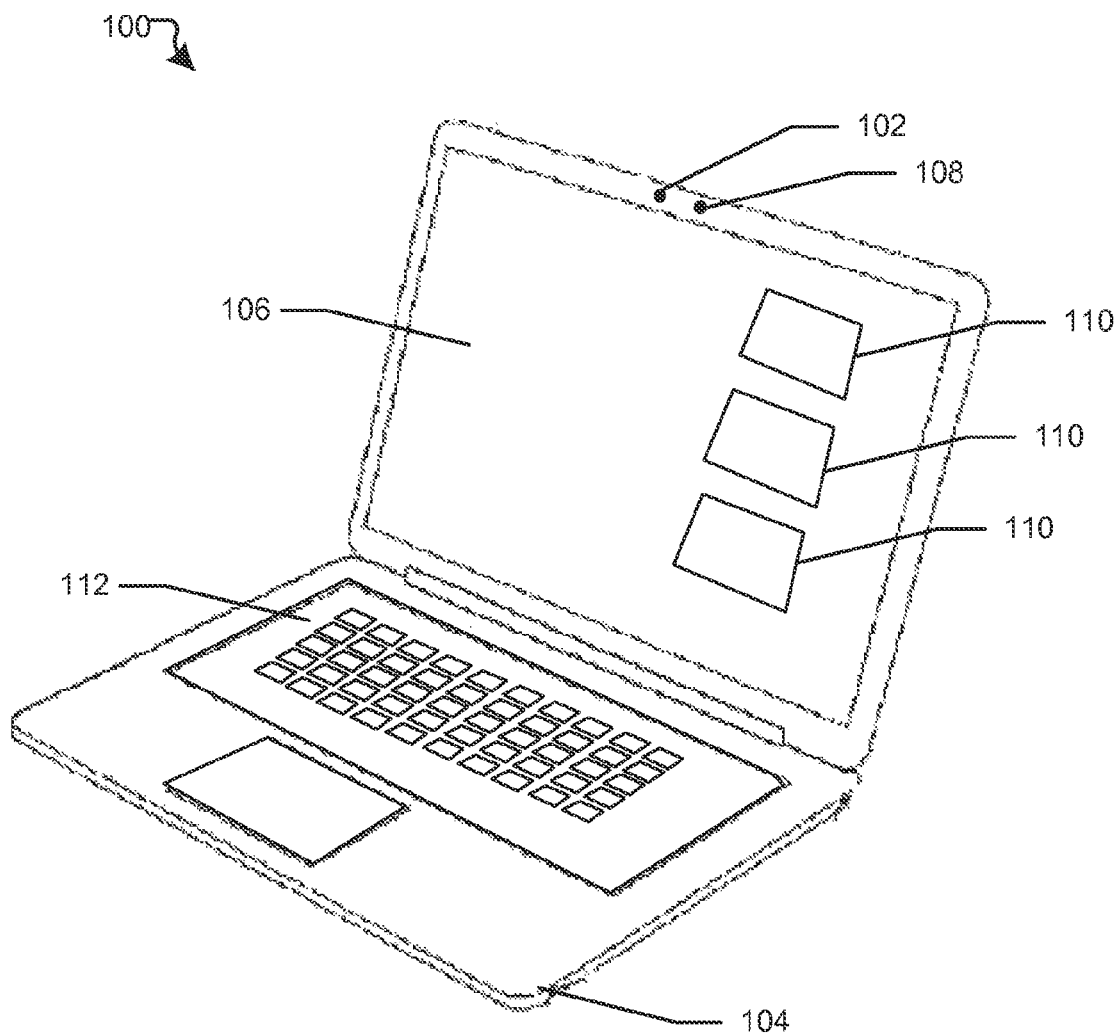
FIG. 1 is a diagram of an information handling system.

FIG. 1 shows an information handling system 100. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a camera 102, a microphone 104, a display screen 106, and a light emitting diode (LED) 108. A user of the information handling system 100 can utilize these components to participate in a video conference. For example, the camera 102 can be used to capture image data, and the microphone 104 can capture audio data. The image and audio data can then be provided to other information handling systems that are also connected to the video conference. The image data can also be provided to the user of the information handling system 100 via the display screen 106, which can also provide images from the other information handling systems. For example, the display screen 106 can display images from the other information handling systems within display windows 110. For clarity, the embodiments described herein refer to the user utilizing the information handling system 100 to participate in a video conference. However, in different embodiments the information handling system 100 can be used to participate in any type of conferencing system, such as an audio conference, without varying from the scope of this disclosure.

During the video conference, the user can utilize a key combination, a gesture, a soft button, or the like to move the image from camera 102 and the images received from the other information handling system among the display windows 110 and the main display of the display screen 106. For example, the user can use a pointing device or the user's finger to select a soft button on the display screen 106, and the selection of the soft button can move the display images, such as clockwise or counter-clockwise, through the main display and the display windows 110 of the display screen. The user may also press a particular key combination on a keyboard 112 of the information handling system 100 to move the images among the main display and the display windows 110 of the display screen 106. Additionally, the user could use a gesture, such as a hand gesture, to move the images among the main display and the display windows 110 of the display screen 106. For example, the hand gesture can be the user holding his or her hand out with the fingers extended, and then turning his or her hand either clockwise or counter-clockwise to indicate the direction that the user would like the images to move among the main display and the display windows 110 of the display screen 106.

While participating in the video conference, the user may want to talk or otherwise communicate with someone that is not involved in the video conference, and the user may not want the other individuals on the video conference to hear and/or see the other communication taking place. In this situation, the user can place the video conference audio and video feeds on hold. The information handling system 100 can pause the audio and video data in response to detecting a trigger event, which can include a gesture, a voice command, pressing of a physical key or button, or another type of input to the information handling system.

In an embodiment, the camera 102 can be a 3-D camera that can distinguish between actions that occur at different depths of the field of view for the camera, and can relay this information to a device/component that determines whether a trigger event is located in the image data. The component can utilize the different depths of field to verify that the user of the information handling system is the actual person performing the gesture for the trigger event. After a trigger event is detected, the LED 108 can provide a visual indication to the user that the video conference feed is on hold. For example, the LED 108 can light up in response to the trigger event being detected and the video conference feed being placed on hold. In an embodiment, an on-screen display on the display screen 106 can provide a notification to indicate that the video conference has been place on hold. The detection of a trigger event in the image data and resulting operations will be discussed in greater detail with respect to FIGS. 2 and 3.

Figure 2:
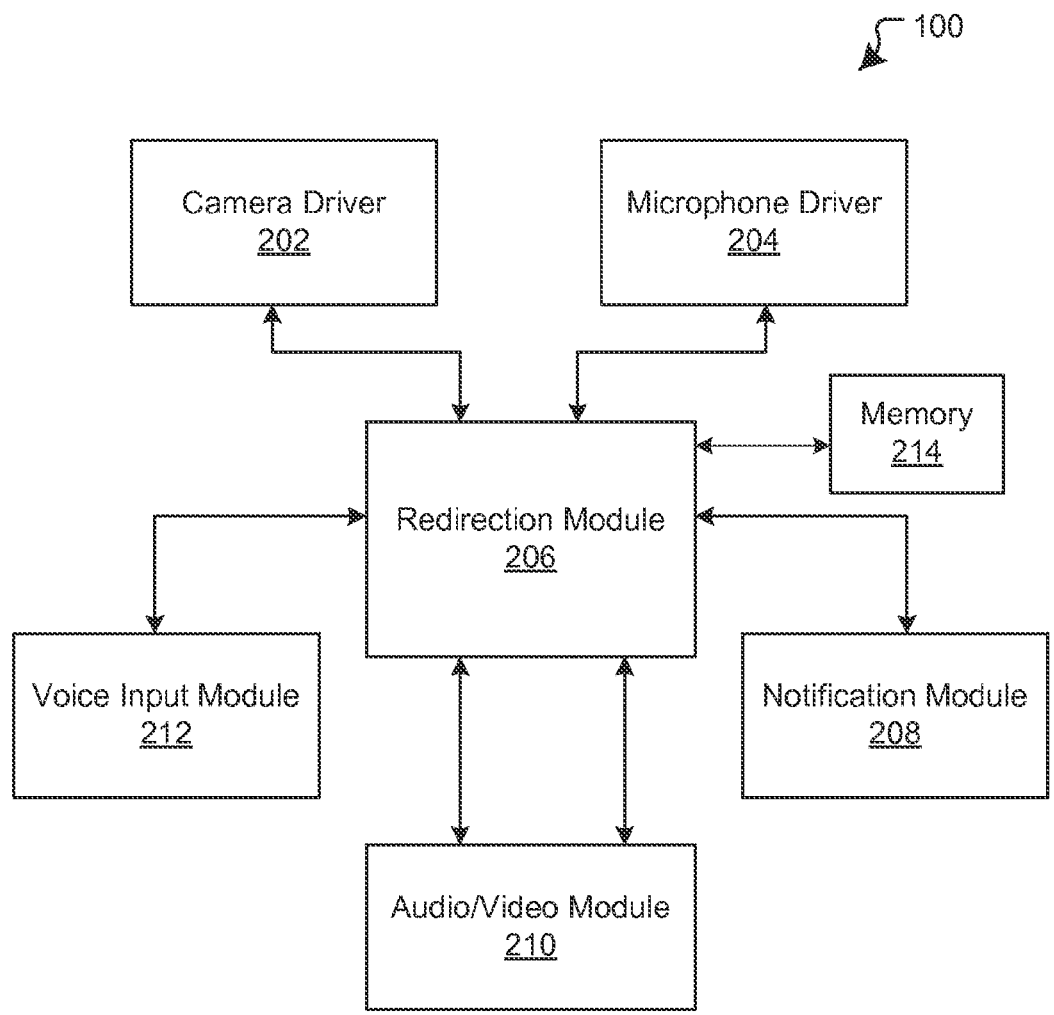
FIG. 2 is a block diagram of a portion of the information handling system.

FIG. 2 shows a portion of the information handling system 100 including a camera driver 202, a microphone driver 204, a redirection module 206, a notification module 208, an audio/video module 210, such as a video conference module, and a voice input module 212. The audio/video module 210 is described herein as a video conference module 210. In another embodiment, the audio/video module 210 can be any module that processes the audio and video data, such as a video recording module, or the like. The camera driver 202 is in communication with the audio redirection module 206. In different embodiments, the camera driver 202 can be part of the camera 102 of FIG. 1, or can be a separate device that is in communication with the camera. The microphone driver 204 is in communication with the audio redirection module 206. In different embodiments, the microphone driver 204 can be part of the microphone 104 of FIG. 1, or can be a separate device that is in communication with the microphone. The audio redirection module 206 is in communication with the notification module 208, with the video conference module 210, and with the voice input module 212. The notification module 208 is in communication with the LED 108 of FIG. 1, The audio redirection module 206 is shown in FIG. 2 as a separate module from the camera driver 202 and the microphone driver 204. However in another embodiment, the audio redirection module 206 can be incorporated into each of the camera driver 202 and the microphone driver 204, and still perform the same operations as described herein.

The camera driver 202 provides image data from the camera 102 to the redirection module 206, and the microphone driver 204 provides audio data from the microphone 104 to the redirection module. The audio redirection module 206 can receive and then analyze audio and image data frames to determine whether a trigger event is detected. In an embodiment, the redirection module 206 can analyze both the audio data and the video data to determine whether a trigger event is detected. In another embodiment, the redirection module 206 can analyze only the image data tier a trigger event, or can analyze only the audio data for a trigger event. The trigger event may also be any other type input received at the information handling system 100. Thus, the trigger event can be a gesture captured in the video data, a voice command detected in the audio data, a physical button or key being pressed, or the like.

The redirection module 206 can determine whether the image data includes a trigger event by comparing the image data received from the camera driver 202 to data stored in a memory 214 associated with the redirection module. The stored data can be associated with one or more gestures that have been previously identified as trigger events. For example, the redirection module 206 can store a variety of preset gestures that are identified as trigger events, and data for the preset gestures can be stored in the memory 214 before the user first uses the information handling system 100 for video conferencing via the redirection module. In an embodiment, the memory 214 can also store historical information about the actions performed by the user, such as trigger events used to place the video conference on hold, an average length of time the video conference is kept on hold, or the like. The memory 214 can also be used to stored intermediate data from the camera driver 202 and the microphone driver 204, and the intermediate data can be utilized by the redirection module 206 to determine whether a trigger event is in the processor of occurring.

Figure 3:
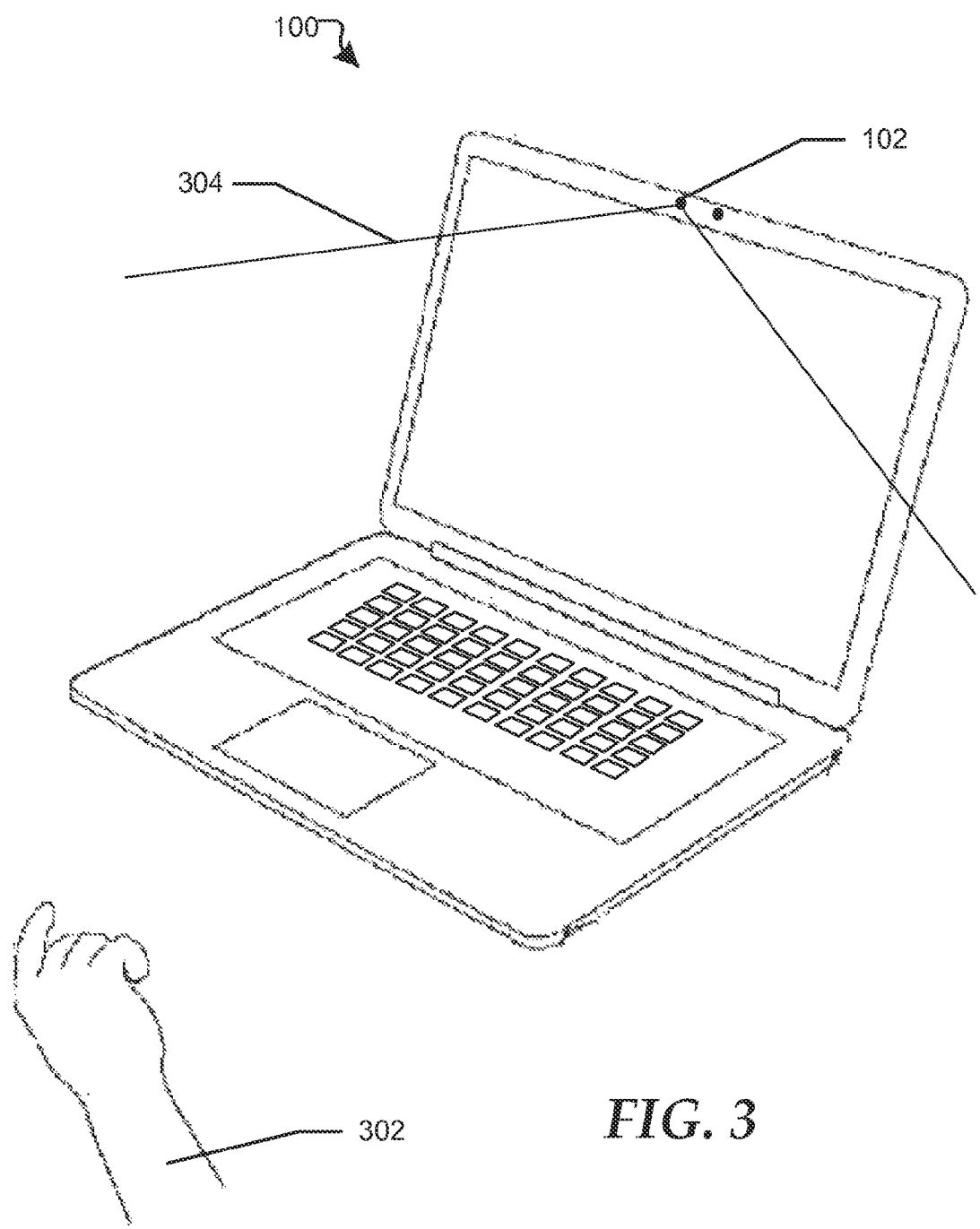
FIG. 3 is another diagram of the information handling system with a gesture providing a trigger event.

FIG. 3 shows the information handling system 100 with a particular gesture 302 located within a field of view 304 of the camera 102. The preset gesture can being any gesture 302, such as a user holding one finger up with the rest the fingers curled down in a field of view 304 of the camera 102 as indicated by the shown embodiment of FIG. 3. The preset gesture can also be a user holding only a single finger to the user's mouth, raising an open hand, covering the user's mouth with the hand, raising a closed hand, or the like.

Referring back to FIG. 2, the redirection module 206 can also use the direction that the user is looking to determine whether a trigger event is detected. For example, a trigger event could be detected if the user is looking away from the camera instead of looking at the camera, looking at a particular part of the screen, or the like. Depending on the trigger event, the redirection module 206 may need to analyze multiple image data frames as a group to determine that a trigger event is detected. For example, a trigger event could be that a user is looking away from the camera 102 for a specific length of time so that the user can look away for brief periods without inadvertently triggering the redirection module 206. Thus, the redirection module 206 may need to analyze multiple image data frames to verify that the user is looking away from the camera 102 in each of the consecutive image data frames before the redirection module can determine that a trigger event is detected.

Figure 5:
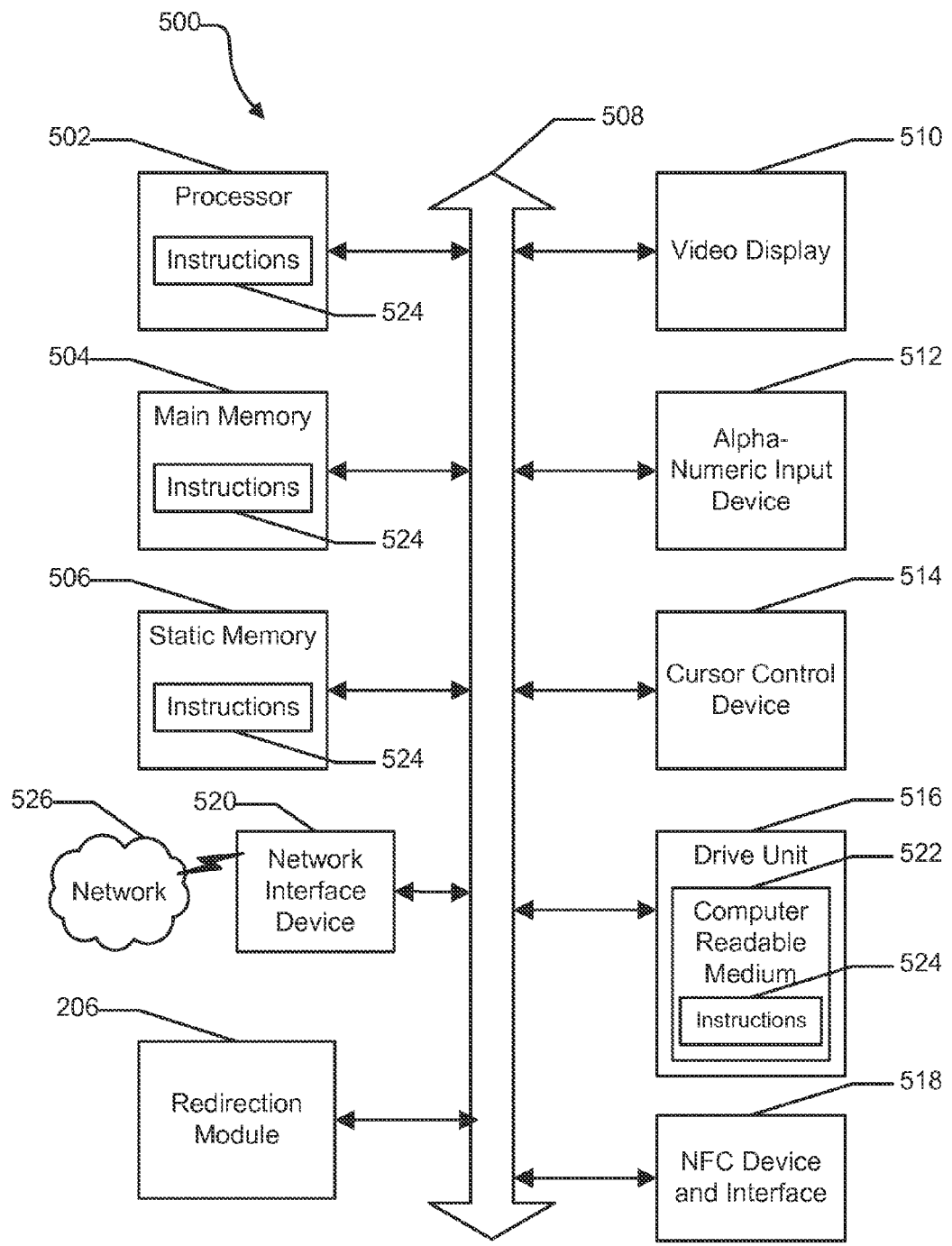
FIG. 5 is a block diagram illustrating a general information handling system according to an embodiment of the present disclosure.

In an embodiment, a processor, such as processor 502 of FIG. 5, execute a training mode to allow the user to add additional gestures 302 as trigger events. For example, the user can open a record gesture graphical user interface, can then select a record option, and can perform the gesture 302 that the user would like to be a trigger event within the field of view 304 of the camera 102 as shown in FIG. 3. The record gesture graphical user interface can prompt the user to repeat the gesture 302 a number of times until the record gesture graphical user interface recognizes the gesture. The record gesture graphical user interface can then provide the user with a message asking whether the user would like the new gesture to be saved as a trigger event. If the user selects to save the new gesture, the record gesture graphical user interface can add the new gesture to the trigger events already stored in the memory 214.

As stated above, the redirection module 206 can receive audio data frames from the camera driver 202 and image data frames from the microphone driver 206. Each time the redirection module 206 receives a new image data frame and a new audio data frame, the redirection module can analyze the image data to determine whether a trigger event is located in the image or audio data. If the redirection module 206 does not detect a trigger event in the image or audio data, the redirection module can provide the unaltered audio and image data frames to the video conference module 210 for encoding and other processing. The video conference module 210 can then send the encoded audio and image data frames to the other information handling systems participating in the video conference. The voice input module 212 can be placed and kept in a low power state while the redirection module 206 does not detect a trigger event, so that the information handling system 100 can conserve power.

If the redirection module 206 detects a trigger event in the image or audio data, the redirection module can wake the voice input module 212 out of the low-power state, can provide a notification indicator to the notification module 208, and can begin providing silent audio data along with the video data to the video conference module 210. The notification module 208 can then light up the LED 108 to provide a visual indication to the user that, the audio data is being muted in the video conference. In another embodiment, the notification module 208 can provide an on-screen display on the display screen 106 to indicate that the video conference has been place on hold. The video conference module 210 can then encode and provide the silent audio data frames with the image data frames to the other information handling systems connected to the video conference. The silent audio data frames can prevent other individuals participating in the video conference from hearing what the user of the information handling system 100 is saying after the trigger event is detected.

While the silent audio data is being provided to the video conference module 210, the redirection module 206 can provide the original audio and image data to the voice input module 212. The voice input module 212 can then utilize the audio data to determine whether the user is providing voice commands or other voice inputs to the information handling system 100. For example, the voice input module 212 can use the audio data to provide dictation for the user to keep notes during the video conference after the trigger event is detected by the redirection module 206. In an embodiment the voice input module 212 can also utilize the video data along with the audio data to improve the voice command recognition. For example, the voice input module 212 can analyze the images associated with the mouth of the user as lip-reading to correlate the image data with the audio data to determine whether voice commands are received. When the redirection module 206 determines that the audio data should no longer be redirected to the voice input module 212, the redirection module 206 can provide the voice input module with a low-power indicator. The voice input module 212 can enter into a low-power mode in response to the low-power indicator.

The redirection module 206 can continue to send the silent audio data to the video conference module 210 until the redirection module detects that the user wants to end the hold on the audio data. For example, the trigger event can have a toggle effect, such that the first time a trigger event is detected the silent audio data frames are provided to the video conference module 210, then the next time a trigger event is detected the current audio data is provided to the video conference module, then the next time a trigger event is detected the silent audio data is again provided to the video conference module, and so on. In an embodiment, the trigger event can be detected as a hold down event. For example, the redirection module 206 provides the silent audio data to the video conference module 210 only while the trigger event continues to be detected. Thus, the user may continue to hold up his or her hand so that the redirection module 206 will continue to provide silent audio data to the video conference module 210.

In an embodiment, the user of the information handling system 100 may also want to modify the image data in response to a trigger event, so that other individuals participating in the video conference will not be able to figure out what the user is saying by reading the user's lips while the audio data is muted. In this situation, the redirection module 206 can modify the image data received from the camera driver 208, and can then provide the modified image data with the silent audio data to the video conference module 210. The redirection module can modify the image data by blurring the image around the user's mouth, by repeating the previous image data, or the like.

In an embodiment, if the trigger event is a voice command the redirection module 206 can include an output buffer, such that the audio data is placed in the output buffer prior to being provided to the video conference module 210. In this situation, if the redirection module 206 detects a voice command, data in the buffer can be sent to the voice input module 212 and the audio data can be replaced with silent audio data so that the voice command is not provided to the video conference module 210 and in turn to the other information handling systems connected to the video conference. In an embodiment, the redirection module 206 may wait until more than one trigger event is detected before redirecting the audio data to the voice input module 212 and providing the silent audio data to the video conference module 210. For example, the redirection module 206 may not redirect the audio data to the voice input module 212 until the redirection module 206 detects two trigger events, such as holding up a finger and looking at the camera 102. In an embodiment, the redirection module 206 can be configured to perform different operations based on the trigger event detected. For example, one trigger event, such as holding up a finger, can cause the redirection module 206 to redirect the audio data to the voice input module 212 while the silent audio data is provided to the video conference module 210. Another trigger event, such as holding up an open hand, can cause the redirection module 206 to provide silent audio data to the video conference module 210 without redirecting the audio data to the voice input module 212. Thus, the redirection module 206 can control whether audio data and possibly image data is provided to the video conference module 210 based on whether a trigger event is detected.

Figure 4:
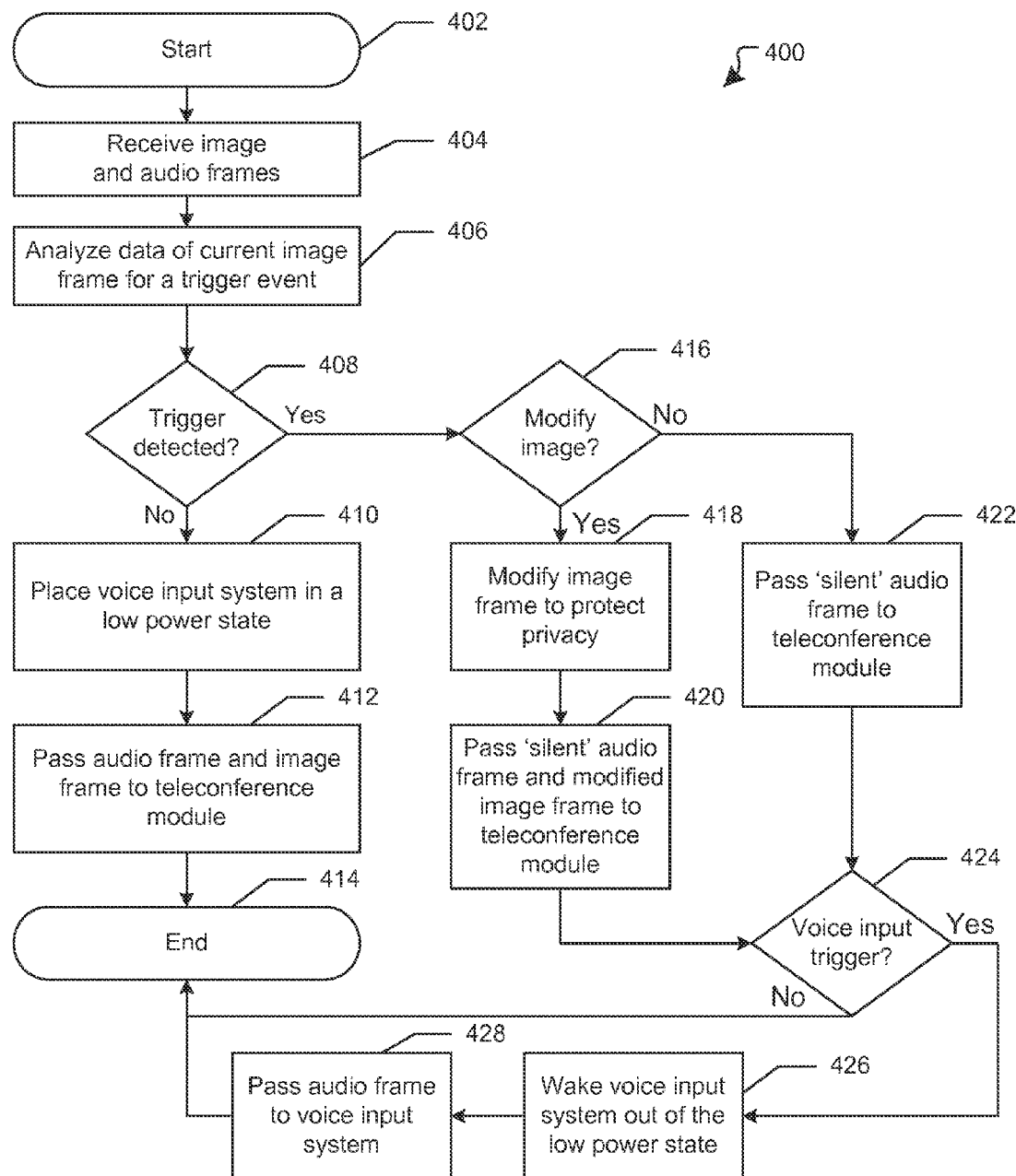
FIG. 4 is a flow diagram of a method for determining whether to provide audio and video data to an audio/video module of the information handling system.

FIG. 4 shows a flow diagram of a method 400 for determining whether to provide audio and image data to a video conference module of an information handling system. The flow starts at block 402 and then proceeds to block 404, where an image data frame and an audio data frame are received at a redirection module. In an embodiment, the image frame can be received from the camera driver 204 of FIG. 2, and the audio data frame can be received from the microphone driver 202. At block 406, data from the image or audio data is analyzed to determine whether a trigger event is found. In an embodiment, a trigger event can be a hand gesture, a direction a user's face pointing in the image, or the like. The flow then proceeds to block 408, during which a determination is made whether a trigger event is detected. If a trigger event is detected the flow continues at block 416, otherwise the flow continues at block 410 and the voice input module is place into a low-power state. The flow then proceeds to block 412, and the audio data frame and the image frame are passed to a video conference module of the information handling system 100. The flow then ends at block 414.

If a trigger event is detected at block 408, the flow continues at block 416 and a determination is made whether to modify the image frame. In an embodiment, the determination can be based on a user setting. For example, during a setup a user can make a selection whether to have the image modified in response to the detection of a trigger event. If the user selects to have the image modified, the user can define how the image is to be modified. For example, the image can be modified by blurring a region around a person in the image, by freezing the image and providing a still image, or the like. If the image frame is to be modified, the flow continues at block 418, otherwise the flow proceeds to block 422. When the image frame is to be modified, the image is modified at block 418. In an embodiment, the image frame is modified to protect the privacy of the user. For example, the modified image frame could blur the mouth of the user, freeze and repeat the previous image data frame as a still image, or the like. The information handling system can then provide the blurred or still frame to the video conference module to be sent to other information handling system. At block 420, a silent audio data frame and the modified image frame is passed to the video conference module. If the image is not to be modified, the silent audio data frame is passed to the video conference module at block 422.

At block 424, a determination is made whether a trigger for voice input is received. If the trigger for voice input is not received, the flow ends at block 414, otherwise the flow proceeds to block 426. At block 426, the voice input module is removed from the low-power state. The audio data frame and current image frame are passed to the voice input module at block 428, and the flow ends at block 414.

FIG. 5 shows an information handling system 500 capable of administering each of the specific embodiments of the present disclosure. The information handling system 500 can represent the information handling system 100 of FIG. 1. The information handling system 500 may include a processor 502 such as a central processing unit (CPU), a graphics processing unit (GPU), or both. Moreover, the information handling system 500 can include a main memory 504 and a static memory 507 that can communicate with each other via a bus 508. The information handling system 500 includes near-field communications (NFC) device and interface 518, such as an antenna and NFC subsystem. The information handling system 500 can also include a disk drive unit 516, and a network interface device 520. As shown, the information handling system 500 may further include a video display unit 510, such as a liquid crystal display (LCD), an organic light emitting diode (OLED), a flat panel display, a solid state display, or a cathode ray tube (CRT). The video display unit 510 may also act as an input accepting touchscreen inputs. Additionally, the information handling system 500 may include an input device 512, such as a keyboard, or a cursor control device, such as a mouse or touch pad. Information handling system may include a battery system 514. The information handling system 500 can represent a device capable of telecommunications, voice communications, and data communications and whose can be share resources among multiple devices. The information handling system 500 can include the redirection module 206, described above. The information handling system 500 can also represent a server device whose resources can be shared by multiple client devices, or it can represent an individual client device, such as a laptop or tablet personal computer.

The information handling system 500 can include a set of instructions that can be executed to cause the computer system to perform any one or more of the methods or computer based functions disclosed herein. The computer system 500 may operate as a standalone device or may be connected such as using a network, to other computer systems or peripheral devices.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, white a single information handling system 500 is illustrated, the term "system" shall also be taken to include any collection of systems or sub-systems that individually or jointly execute a set, or multiple sets, of instructions to perform one or more computer functions.

The disk drive unit 516 or static memory 514 may include a computer-readable medium 522 in which one or more sets of instructions 524 such as software can be embedded. The disk drive unit 516 or static memory 514 also contains space for data storage. Further, the instructions 524 may embody one or more of the methods or logic as described herein. In a particular embodiment, the instructions 524 may reside completely, or at least partially, within the main memory 504, the static memory 506, and/or within the processor 502 during execution by the information handling system 500. The main memory 504 and the processor 502 also may include computer-readable media. The network interface device 520 can provide connectivity to a network 526, e.g., a wide area network (WAN), a local area network (LAN), wireless network (IEEE 802), or other network. The network interface 520 may also interface with macrocellular networks including wireless telecommunications networks such as those characterized as 2G, 3G, or 5G or similar wireless telecommunications networks similar to those described above. The network interface 520 may be a wireless adapter having antenna systems 532 for various wireless connectivity and radio frequency subsystems 530 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected. hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal; so that a device connected to a network 528 can communicate voice, video or data over the network 528. Further, the instructions 524 may be transmitted or received over the network 528 via the network interface device 520. In a particular embodiment, BIOS/FW code 524 reside in memory 504, and include machine-executable code that is executed by processor 502 to perform various functions of information handling system 500.

Information handling system 500 includes one or more application programs 524, and Basic Input/Output System and Firmware (BIOS/FW) code 524. BIOS/FW code 524 includes functions to initialize information handling system 500 on power up, to launch an operating system, and to manage input and output interactions between the operating system and the other elements of information handling system 500.

In another embodiment (not illustrated), application programs and BIOS/FW code reside in another storage medium of information handling system 500. For example, application programs and BIOS/FW code can reside in drive 516, in a ROM (not illustrated) associated with information handling system 500, in an option-ROM (not illustrated) associated with various devices of information handling system 500, in storage system 507, in a storage system (not illustrated) associated with network channel 520, in another storage medium of information handling system 500, or a combination thereof. Application programs 524 and BIOS/FW code 524 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   receiving, at a redirection module of an information handling system, an audio data frame from a microphone of the information handling system and an image data frame from a camera of the information handling system;
   analyzing the image data frame for a trigger event;
   in response to detecting the trigger event in the image data frame, verifying that a user of the information handling system is a person performing the detected trigger event;
   in response to verifying that the user is the person performing the detected trigger event, replacing the audio data frame with a silent audio data frame; and
   in response to detecting the trigger event in the image data frame, providing the silent audio data frame to an audio/video module of the information handling system, otherwise providing the audio data frame to the audio/video module.

2. The method of claim 1, further comprising:
   determining whether a modified image output has been selected;
   modifying the image frame in response the modified image output being selected; and
   providing the modified image frame with the silent audio data frame to the audio/video module.

3. The method of claim 2, wherein modifying the image frame includes producing a still image frame, and providing the still image frame instead of the image frame.

4. The method of claim 2, wherein modifying the image frame includes blurring a portion of the image frame.

5. The method of claim 1, further comprising:
   receiving a second audio data frame and a second image data frame;
   analyzing the second image data frame to determine whether the trigger event is in the second image data frame; and
   providing the second audio data frame and the second image data frame to the audio/video module instead of the silent audio data frame in response to the trigger event being detected in the second image data frame.

6. The method of claim 1, further comprising:
   providing a visual output indicator to a user in response to the trigger event being detected, wherein the visual output indicator notifies the user that the silent audio data frame is being provided to the audio/video module.

7. The method of claim 1, wherein the event trigger is a gesture by the user.

8. An information handling system comprising:
   a hardware redirection module to receive an audio data frame from a microphone of the information handling system and an image data frame from a camera of the information handling system, to analyze the image data frame for a trigger event, in response to the trigger event being detected in the image data frame to verify that a user of the information handling system is a person performing the detected trigger event, in response to verifying that the user is the person performing the detected trigger event to replace the audio data frame with a silent audio data frame and to provide the silent audio data frame, otherwise to provide the audio data frame; and
   a hardware audio/video module to communicate with the hardware redirection module, the hardware audio/video module configured to receive and transmit either the audio data frame or the silent audio data frame.

9. The information handling system of claim 8, wherein the hardware redirection module further to determine whether a modified image output has been selected, to modify the image frame in response the modified image output being selected, and to provide the modified image frame with the silent audio data frame to the audio/video module.

10. The information handling system of claim 9, wherein the modified image frame is a still image frame.

11. The information handling system of claim 9, wherein the modified image frame includes a blurred a portion of the image frame.

12. The information handling system of claim 8, wherein the hardware redirection module further to receive a second audio data frame and a second image data frame, to analyze the second image data frame to determine whether the trigger event is in the second image data frame, and to provide the second audio data frame and the second video frame to the hardware audio/video module instead of the silent audio data frame in response to the trigger event being detected in the second video frame.

13. The information handling system of claim 8, further comprising:
   a notification module to communicate with the hardware redirection module, the notification module to provide a visual output indicator to a user in response to the trigger event being detected, wherein the visual output indicator notifies the user that the silent audio data frame is being provided to the hardware audio/video module.

14. The information handling system of claim 8, wherein the event trigger is a gesture by the user.

15. A method comprising:
receiving, at a redirection module of an information handling system, an audio data frame from a microphone of the information handling system and an image data frame from a camera of the information handling system;
determining whether a trigger event is detected in either the image data frame or the audio data frame;
in response to detecting the trigger event, verifying that a user of the information handling system is a person performing the detected trigger event;
in response to verifying that the user is the person performing the detected trigger event, redirecting the audio data frame from an audio/video module to a voice input module; and
in response to verifying that the user is the person performing the detected trigger event, providing a silent audio data frame to the audio/video module.

16. The method of claim 15, further comprising:
determining whether a modified image output has been selected;
modifying the image data frame in response the modified image output being selected; and
providing the modified image data frame with the silent audio data frame to the audio/video module.

17. The method of claim 16, wherein modifying the image data frame includes producing a still image data frame, and providing the still image frame instead of the image frame.

18. The method of claim 16, wherein modifying the image data frame includes blurring a portion of the image data frame.

19. The method of claim 15, further comprising:
receiving a second audio data frame and a second image data frame;
determining whether the trigger event is detected in either the second image data frame or the second audio data frame; and
providing the second audio data frame and the second image data frame to the audio/video module instead of the silent audio data frame in response to the trigger event being detected.

20. The method of claim 15, further comprising:
providing a visual output indicator to a user in response to the trigger event being detected, wherein the visual output indicator notifies the user that the silent audio data frame is being provided to the audio/video module.

* * * * *